United States Patent [19]

Savitzky et al.

[11] Patent Number: 6,012,083
[45] Date of Patent: Jan. 4, 2000

[54] METHOD AND APPARATUS FOR DOCUMENT PROCESSING USING AGENTS TO PROCESS TRANSACTIONS CREATED BASED ON DOCUMENT CONTENT

[75] Inventors: Stephen R. Savitzky, San Jose; Gregory J. Wolff, Mountain View, both of Calif.

[73] Assignee: Ricoh Company Ltd., Japan

[21] Appl. No.: 08/718,858

[22] Filed: Sep. 24, 1996

[51] Int. Cl.[7] .............................. G06F 17/00; G06F 17/30
[52] U.S. Cl. .................... 709/202; 709/203; 709/217; 709/218; 709/227; 707/10; 707/104
[58] Field of Search .................................... 395/821, 828, 395/859, 882, 892, 670, 675, 200.3–200.33, 200.36, 200.47–200.49, 200.52–200.6, 200.66, 200.76, 200; 707/1–4, 9–10, 100–104; 709/200–203, 206, 217–219, 227–230, 236, 246

[56] References Cited

U.S. PATENT DOCUMENTS

| | | | |
|---|---|---|---|
| 5,329,619 | 7/1994 | Page et al. ............................... | 709/203 |
| 5,603,029 | 2/1997 | Aman et al. ............................. | 709/105 |
| 5,678,041 | 10/1997 | Baker et al. ............................. | 709/229 |
| 5,701,451 | 12/1997 | Rogers et al. .......................... | 709/202 |
| 5,740,362 | 4/1998 | Buickel et al. ......................... | 707/10 |
| 5,794,250 | 9/1998 | Carino, Jr. et al. ..................... | 707/104 |
| 5,819,273 | 10/1998 | Vora et al. .............................. | 707/10 |
| 5,822,539 | 10/1998 | Van Hoff ................................ | 709/236 |
| 5,848,413 | 12/1998 | Wolff ........................................ | 707/10 |

*Primary Examiner*—Zarni Maung
*Assistant Examiner*—Bharat Barot
*Attorney, Agent, or Firm*—Philip H. Albert; Townsend and Townsend and Crew LLP

[57] ABSTRACT

A Web agency is interposed between a Web client and a Web server to transform the requests from the Web client prior to sending the requests on to the Web server, to transform the document returned from the Web server prior to sending the document on to the Web client, and to store state information about the user of various Web clients connected to the Web agency. The Web agency can be transparent to, and independent of, the Web client and the Web server. The Web agency might be used as a peripheral agency, a personal service agency or a document server. One such Web agency is a printer server which transparently renders documents. For hypertext documents, the rendering process includes generating machine-readable link references.

19 Claims, 7 Drawing Sheets

METHOD AND APPARATUS FOR DOCUMENT PROCESSING USING AGENTS TO PROCESS TRANSACTIONS CREATED BASED ON DOCUMENT CONTENT

BACKGROUND OF THE INVENTION

The present invention relates to the field of information handling and processing. More specifically, in one embodiment, the present invention provides for improved processing of information embodied in documents transferred over a network such as the Internet.

The term "Internet" refers to a global internetwork of networks which has gained wide usage in recent times. Communication between any two computers (nodes) can occur on the Internet so long as both computers are connected somewhere to the Internet. The most common protocol for data communications over the Internet is TCP/IP (Transport Control Protocol/Internet Protocol). In a layer above TCP/IP, a number of different transport applications are known. FTP (File Transfer Protocol) is a protocol used to move files from one machine to another. Because of it use, the typical FTP client has an interface similar to a file manager, displaying lists of files and allowing for navigation through directory structures, etc. SMTP (Simple Mail Transfer Protocol) is a protocol used to move e-mail messages between host machines on their way to their eventual destination, usually without user interaction. HTTP (HyperText Transfer Protocol) is a protocol used to transfer documents between nodes where most documents are World Wide Web ("WWW" or "Web") documents (i.e., documents with links to other documents). Typically, HTTP is used between a Web server and a Web browser client. Documents transferred using HTTP might be made up of several components, such as graphic elements and forms, and might include references to other documents. Because a Web browser can display documents for viewing (text, graphics, or video documents) or listening (audio documents) by an end user and can jump from one referenced document to another, an end user perceives that the documents provided using HTTP form a web of documents, hence the term World Wide Web ("WWW" or "Web") used to refer to the collection of linked documents controlled by thousands of entities available over the Internet using HTTP.

Fundamentally, HTTP is a document transport protocol. In current HTTP systems, an HTTP client (usually, but not necessarily, a browser) sends an HTTP request for a document to an HTTP server, which returns the document (if the client has permission to read the document). If the document is a compound document, the HTTP client will read the returned document to find references to embedded documents (typically graphic images) and send out HTTP requests for those embedded documents. When enough data is received to form a document image, the Web browser displays an image of the document. The increasing popularity of the Web is due in part to the fact that a user need only request a document in order to look at it. By contrast, with FTP, the user would have to select a file from a list of files, transfer that file, open the file to determine if any embedded files are needed, select those files from a list, download them, and then finally construct a view of the document.

In some applications, more is required than simply transferring pre-existing documents. Instead of a fixed document, a user might want to receive a document which is dynamically generated when a request for the document is received. One mechanism for creating dynamic documents is the use of Common Gateway Interface (CGI) scripts. With CGI scripts, a client sends a server a document request for a document in the form of a URL (Uniform Resource Locator) where the URL refers not to a document on the server but to a program on the server. The server generates a document in accordance with the program and returns that document to the browser. The server identifies the request as a request to execute a script rather than a request for a document and the server executes the CGI script, possibly using arguments passed as part of the URL. Most browsers make no distinction between a URL for an existing document and a URL for a dynamically generated document. This allows a client browser which is set up only to request and receive documents to display the results of server-side code execution. CGI scripts are used to interface a browser to a database engine on the server side, with search requests being sent to the server as URLs and the search results being returned as a document. Because they are executed at the server-side and the browser makes no distinction, the user cannot control how and when CGI scripts are used.

The user has more control over execution of programs if the computing is transferred with a document, as with the Java language specified by Sun Microsystems, Inc., of Mountain View, Calif. used for writing client-side code (applets). With client-side code execution, the client requests a document and the returned document contains program code imbedded in the document. The client browser, which must be aware of client-side code, executes the code upon receipt. Client-side code execution finds its greatest use performing simple tasks, such as animating graphic elements of a document, which would otherwise require large amounts of bandwidth to execute on the server and transfer over the link between the server and the client.

Java scripts and CGI scripts differ in their locus of execution, but not much else. They are still server-controlled programs because the server operator specifies which Java scripts will be attached to a document. Because both of these methods are server operator specified, they limit flexibility for the user. Server-side code execution cannot be used at the discretion of the reader, since it is set and controlled by the developer of the server Web site. Client-side code execution is limited to documents in which a server has included applets and is limited to use with applet-aware browsers.

Several approaches to providing user flexibility and control have been tried. One approach is to provide specialized client agents. Client agents execute on the same machine as the browser client, to do such things as gather stock quotes, play sound recordings and perform searches. Client agents can be used with the browser client if the browser is aware of the client. For example, a Real Audio™ audio player is a simple client agent which can route audio files encountered by a Netscape™ Web browser to a computer's speakers because the Web browser has hooks to the audio player. For Web browsers which are not aware of the audio player, the result is that the browser cannot understand what to do with an audio file it receives. Client agents are also limited in what they can do by the bandwidth connecting the client to the network.

Roaming agents are more flexible than client-side or server-side agents, but are not likely to see widespread use. A roaming agent is a program which performs a task specified by the owner of the agent, where the locus of execution changes depending on what the agent finds during execution. While a network with sufficient computing power at each node now exists, roaming agents are still impractical, but for a different reason. With the growth and commercialization of the Internet, security is a problem and resources can be easily overloaded. Consequently, very few server operators would permit the execution of roaming agents on their systems. For the near future, the only agents which will be allowed to run on servers are agents specifically selected by the server operator. Otherwise, servers would be quickly swamped by users seeking a locus for their agents, or even companies running agents on their competitors' servers to "steal" computing power.

The underlying problem of these various agent systems is that the average user has no suitable place to execute generalized agents, as users are limited to server-side agents provided at the discretion of the server operator or client-side agents which only interact with clients which are aware of the agents and which are often controlled by the server operator.

Specialized systems for information organization have been proposed which can process user information at a locus other than the server or the client, but these information systems require all servers and clients to be aware of the information system. WWWinda, Prospero and TckWWW Robot are examples of such information systems.

What is needed is a computing system which operates preferably in a document-oriented framework such as the World Wide Web, which allows for general agent execution at a locus specified by the user independently of the server or client which might be used.

SUMMARY OF THE INVENTION

An improved document-oriented computing system is provided by virtue of the present invention. In one embodiment, a computing system used is referred to as an "agency" which forms the locus of execution for user agents. The agency is interposed between one or more Web clients and one or more Web servers. The agents executed at the agency interact with the clients and servers by transferring documents. The agents are transparent to clients or servers which are not aware of the agency and preferably operate transparently between servers and clients even where a client or server is aware of the agency. The agency can be used in a number of applications where document requests are sent from clients to servers and vice versa and the documents need to be transformed by a computing agent while traversing the network or state needs to be preserved.

A personal information agency is an agency interposed between the various clients used by a user and the various servers accessed by those clients. The personal information agency provides a locus for user agents, such as a history agent, which maintains a history of all documents accessed by the user, a hotlist agent, which maintains a list of documents "bookmarked" by the user, and a mirror agent which sends to a recipient client a duplicate of each document sent to a user client. User agents might also be transformative agents, such as a machine-readable-link agent which transforms documents from a server to a client by inserting links to referenced documents where the links are machine readable even after the document is printed.

In general, an agency executes agents on transactions and is open to accepting new agents and new types of transactions. Some agents might perform minor actions on a transaction, such as noticing and modifying particular transactions, while other agents might perform more major actions to fully handle the transaction, such as fulfilling a transaction or forwarding it.

In some embodiments, the Web agency is an appropriately programmed digital computer distinct from a digital computer programmed to execute the Web client, while in other embodiments, the Web agency and the Web client are two processes executing on a single computer. Many specific variations, usually determined by bandwidth and available computing power, of clients, agencies and servers should be apparent to the person of ordinary skill in the art after reading this disclosure.

One specific embodiment of a Web agency is a Web agency designed to interact with document-oriented peripherals. Another embodiment is a personal information agency, which tracks a user's state and history over multiple Web clients and Web servers. Tracking a user's state allows for a cross-client history list to be created, as well as a set of preferences which would be used by the personal information agency to transform all documents received from various servers into a uniform format for presentation to the user.

One advantage of the Web agency is that it decouples information management from information display, thereby making these tasks independent. Another advantage is that the Web agency allows for user interfaces which deal with documents rather than text or a graphical user interface.

Yet another advantage of the Web agency is that computing in the stream of document transfer can occur even using a stateless message passing protocol such as HTTP. Because no shared state, other than as embodied in documents, need be communicated between agencies, clients and servers, implementation is greatly simplified.

A further understanding of the nature and advantages of the inventions herein may be realized by reference to the remaining portions of the specification and the attached drawings.

Appendix A is a listing of various agencies and agents provided for by the present invention.

DESCRIPTION OF THE PREFERRED EMBODIMENTS

The preferred embodiments for carrying out the invention will now be described with reference to specific uses of the invention, however the invention is not so limited. After reading this disclosure, the person of ordinary skill in the art will understand other useful variations of the embodiments described.

Figure 1:
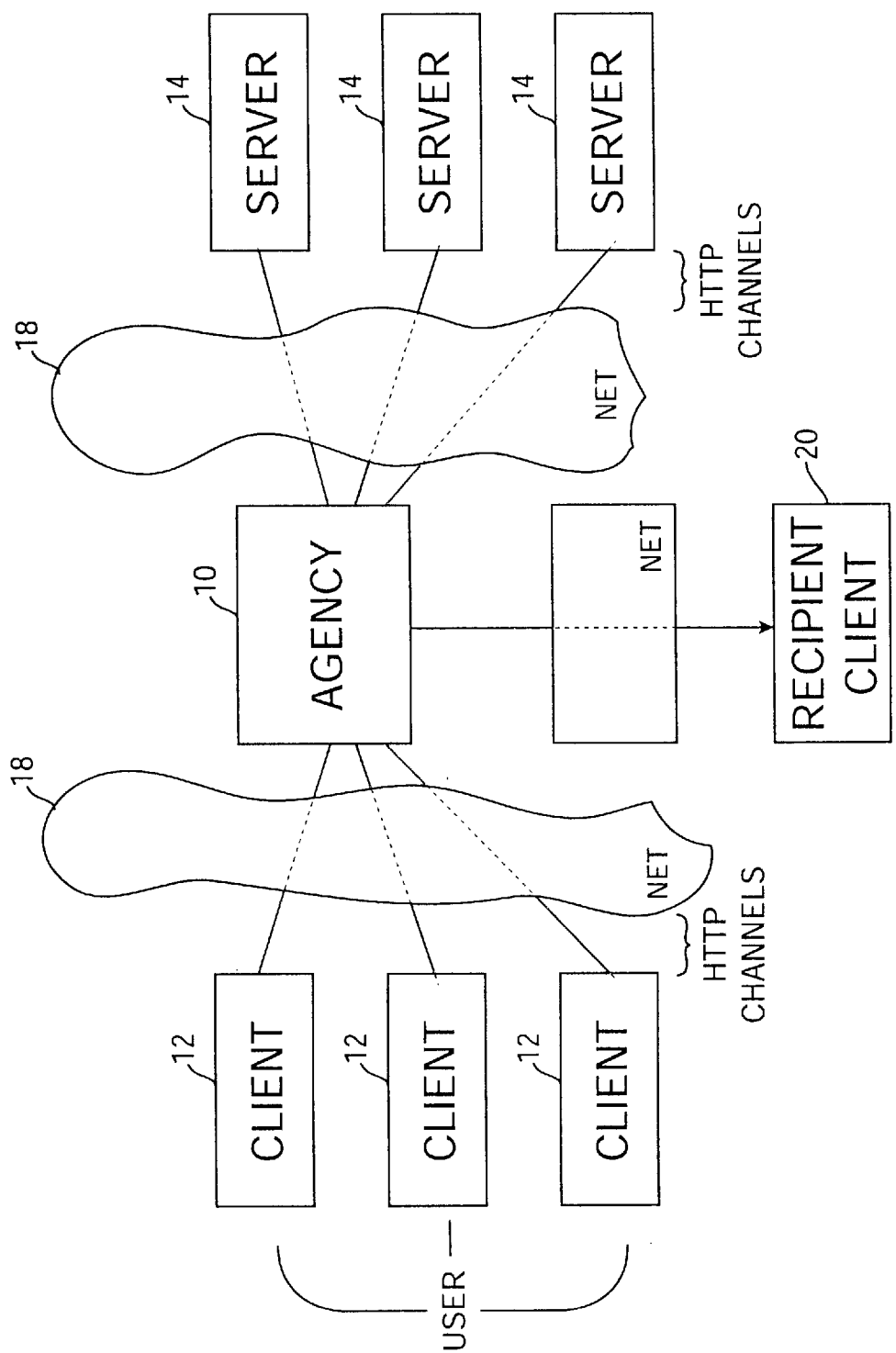
FIG. 1 is a block diagram of an agency according to the present invention interposed between a variety of Web clients and Web servers in a document-oriented computing system.

FIG. 1 is a block diagram of an agency 10 in a typical system environment in which the invention is used.

Although a user might access agency 10 directly, the user typically accesses agency 10 by some action taken with a Web client 12 to access a Web server 14. As explained below, agency 10 is often transparent to Web client 12, which need not be programmed in anticipation of an agency. Web client 12 and Web server 14 are programmed to communicate with each other using a hypertext document transfer protocol such as HTTP over a channel 16. Channels 16 can be physical channels, but are typically logical channels. A channel 16 connects a Web client 12 and a Web server 14 either directly or via a network 18 such as the Internet.

Interposed between the Web clients 12 and the Web servers 14 is agency 10. In some cases, documents are routed not to the requesting Web client 12 but to a recipient client 20. A recipient client 20 has a number of uses, such as being a client which presents a passive "copy" of the activity at an active Web client 12.

Figure 2:
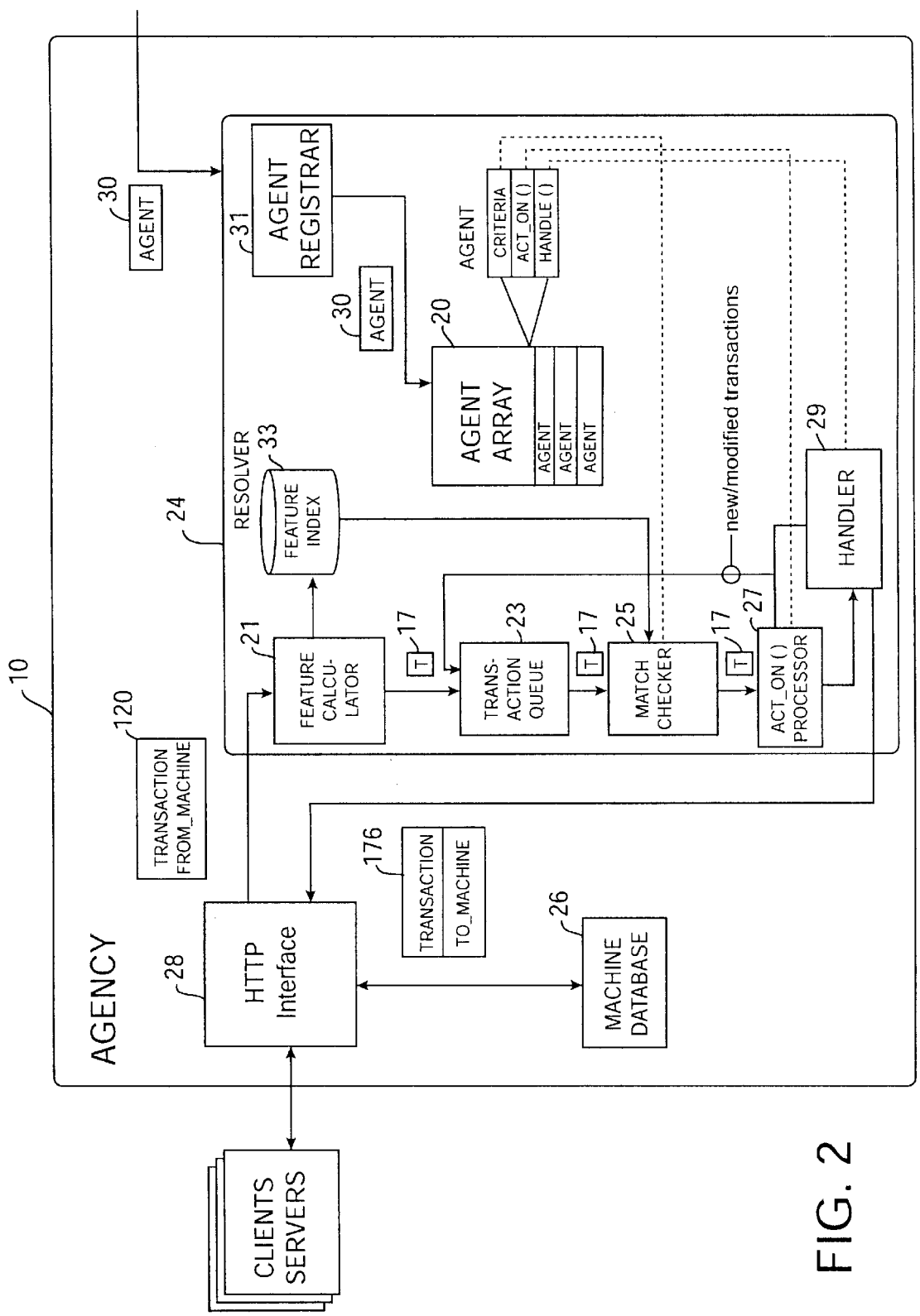
FIG. 2 is a block diagram of a single Web agency and its internal structure.

Because agency 10 sends and receives HTTP document requests and documents, it can interact with Web clients and Web servers which only expect to be communicating with HTTP clients or servers. FIG. 2 is a more detailed view of agency 10 illustrating how this occurs. Although FIG. 2 illustrates an agency which interacts with clients and servers primarily through HTTP, it should be understood that the agency is adaptable to be used with other protocols and in non-Web environments.

Agency 10 is shown accepting transactions (17, 17a, 17b, etc.) from clients and servers via an HTTP interface 28 and accepting agents 30 from outside sources. Agency 10 includes a resolver 24 which processes transactions using agents 30. Resolver 24 includes an agent array 20, a feature calculator 21, a transaction queue 23, a match checker 25, an "act_on" processor 27, a handler 29 and an agent registrar 31.

Before agency 10 can operate on transactions it must have one or more agents 30 in agent array 20, although agencies might be instantiated with a standard set of agents already present, such as a "agent install" agent which handles transactions carrying agents to be installed. Agent registrar 31 (which itself might be the agent install agent) receives agents 30 and places them onto agent array 20. As shown in FIG. 2, each agent has at least one criterion, an act_on() method and a handle() method, the uses of which are explained below. As part of the agent install process, the agent will "register" its criteria with resolver 24. Resolver 24 may then store the registered criteria in a match table which is indexed by criterion. This allows for quick and easy retrieval of a list of interested agents for any given criteria or features.

The role of resolver 24 is to receive transactions and have agents do something with the transaction. When the action taken by the agent resolves, or "handles", the transaction, the transaction is deleted from resolver 24. Such agent actions are referred to as a handle() methods, which is distinguished from act_on() methods, which act on a transaction but do not fully handle the transaction. In order to allow for an open and expandable agency, the agents, their methods, or the transactions that can be handled, are not set ahead of time. Because of this, resolver 24 must be agile in processing transactions. Resolver 24 does not specify which transactions are acted upon or satisfied by which agents. Instead, the agents in agent array 20 specify criteria for which types of transactions they will act on or handle and the transactions specify their own features. Thus, resolver 24 matches transactions with agents based on features included in the transactions and criteria included in the agent. This concept is explained below in connection with the description of the operation of agency 10.

The operation of agency 10 will now be described. Upon instantiation, agency 10 might already have a few standard agents 30 in its agent array 20, such as an agent install agent. As clients and servers send transactions 17 to agency 10, the transactions are received by HTTP interface 28. A typical transaction structure is shown in Table 1, however it should be understood that not all elements are present in all transactions.

TABLE 1

Elements of a Transaction

| Element | Description |
| --- | --- |
| Name/ID | Uniquely identifies transaction within the agency; similar to a process ID |
| From_Machine | The source of the transaction; could be a client, server or another agency; if it doesn't apply, this element might not be instantiated or be instantiated with a null value |
| To_Machine | The destination of the transaction; could be a client, server or another agency; if it doesn't apply, this element might not be instantiated or be instantiated with a null value |
| Handler_Queue | List of pointers to agents which might handle this transaction |
| Default_Handler() | In case no agent is willing or able to handle this transaction, it carries instructions (a method) for handling itself |
| Feature List | List of feature values applicable to this transaction |
| Data | The data of the transaction |

When a transaction is received by resolver, it is first processed by feature calculator 21. Feature calculator 21 generates the feature list for a transaction by scanning the data element (and possibly other elements) of the transaction to come up with a feature set. Examples of transaction features are shown in Table 2. The feature list is a "cache" of features of the transaction. By evaluating all the features once, the transaction data does not have to be scanned each time an agent needs to know if the transaction has certain characteristics. Of course, if a transaction is modified, the transaction might be reprocessed by feature calculator 21 or an equivalent process.

Each transaction feature is represented in feature calculator 21 by a snippet of code (a C or Perl function, or the like) so that additional features can be added at any time to the feature calculator's known set of features. For example, if a new graphics document format, XYZ, were to be developed after an agency were in place, a new feature snippet IS_XYZ could be sent to the resolver (possibly using a transaction directed at a "feature installer" agent) for insertion to feature calculator 21. Then, when feature calculator 21 scans a transaction's data, if it detects the XYZ format, the new snippet of code would give a return value of "true" and the feature calculator would add IS_XYZ to the list of features for that transaction. As explained below, since agents each carry their own criteria, an agent programmed to act on or handle XYZ format documents can be easily installed into agency array 20.

TABLE 2

Transaction Features

| Feature | Description |
| --- | --- |
| is_response* | This transaction is a response to a request |
| is_request* | This transaction is a request for a document |
| is_agent_response* | This transaction is a response from an agent (agents can create transactions) |
| is_proxy_request* | This transaction is a request from/to a proxy |
| is_agent_request* | This transaction is a request from/to an agent |
| is_text | This transaction's data is a text document |
| is_html | This transaction's data is an HTML format document |
| is_image | This transaction's data is an image |
| is_local_source | This transaction is from a source within the agency |
| client_is_netscape | The client dealing with this transaction is a Netscape ™ browser or compatible browser |
| is_file_request | This transaction is a request for a file |
| is_interform | This transaction is an interform (a document which combines a program with a form) |

*These features exist by default for each transaction

Once the feature list is generated and associated with the transaction, the transaction is stored in transaction queue 23. From there, the transactions examined by match checker 25. In an object oriented environment, the functionality of match checker 25 might be implemented as a set of match checking methods which are part of each agent. Either way, each agent is matched with each transaction to see which transactions match. Matching is based on an agent's criteria, which is a boolean expression specific to the agent, where the expression is a function of features. For example, a criteria expression for an agent might be:

is_file_request==true && is_local_source==false

The criteria expression for an agent indicated those transactions of interest to the agent. If the criteria expression evaluates to "false", the agent is not interested in the transaction. If the criteria expression evaluates to "true", then the agent is interested in the transaction. Thus, for the above criteria expression, if the transaction's feature list indicated that the transaction is a file request and it is from a nonlocal source, then the agent would process the transaction. In some embodiments, an agent might have separate criteria expressions for act_on() methods and handle() methods. In an efficient implementation, each agent does not look at each transaction. Instead, each agent looks at a feature index 33, which is a sorted table of features and references to the transactions having those features. That way, each agent need only scan the transactions of interest. Of course, an agent-feature index might also be used so that, when processing a transaction, irrelevant agents can be ignored.

If an agent is interested in acting on the transaction (as indicated either by an overall criteria expression or a specific act_on criteria expression), the agent's act_on() method is invoked on the transaction. This can be performed by act_on processor 27 or performed logically by execution of the agent's act_on() method. Where threaded processes are used, each act_on() method could be a separate forked process to allow for parallel processing.

The act_on() method could include taking an I/O action, performing computation, adding a transaction or modifying a transaction's data, feature set, or other data element. In the preferred embodiment, I/O actions are reserved for handle() methods, so that all act_on() methods can be blocking (synchronous) calls without worrying about holding up processing for an I/O call. If a transaction needs some processing which is I/O related but does not fully handle the transaction, a new transaction is created with the handling of the new transaction being the nonhandling I/O of the original transaction.

Once a transaction is acted on by all interested agents, the transaction passes (either actually or logically) to handler 29. As with act_on processor 27, handler 29 might be a logical construct where the handling is performed by merely calling a handle() method of the agent. In one implementation, each agent which is interested in handling the transaction hooks a pointer of its handle() method to the handler queue of the transaction. For efficiency, the agent's act_on() method might add the hook when the act_on() method is called. The agent might add a hook to other than its own handle() method. For example, the agent might add a hook to another transaction on a code snippet.

When all interested agents have hooked into the handler queue, handler 29 steps through the queue and invokes the handle() methods in order. If the agent finds that it can actually fully handle the transaction, its handle() method returns a return value of "true" and handler 29 deletes the transaction from transaction queue 23 or handler 29, as appropriate. If the agent finds that it cannot fully satisfy the transaction, the agent's handle() method performs any steps which the agent wants to take for nonhandled transactions and returns a return value of "false" so that handler 29 will proceed to check with the next agent for handling. If handler 29 reaches the end of a transaction's handler queue without any agent returning "true", handler 29 invokes the transaction's default handle() method. As should be understood, each of these active elements of resolver 24 and agency 10 can either be separate computing devices or merely different processes or routines executed by a general purpose computing device.

Where a transaction is going to more than one destination, one agent's act_on() method might clone the transaction and set each transactions to machine field to one of destinations.

As described above, a transaction 17 is received by resolver 24, the transaction's features are cached in a features list associated with that transaction and transaction 17 is placed on transaction queue 23. The features list might be cross-referenced in features index 33. Resolver 24 then identifies agents 30 in agent array 20 which have criteria expressions which evaluate to "true" when evaluated with the features of transaction 17. Those agents 30 act on transaction 17 to perform I/O, perform computation, alter stored state or internal data, create new transactions or modify transaction 17. Either as part of the act_on() method or separately, resolver 24 builds a queue of handlers for transaction 17 and invokes each of the handlers in the queue in turn until the handle() method returns a value of "true", or invokes a default handler if no agent's handle() method returns a value of "true". In this way, transactions can be processed by the agency 10 even if the agents which do the processing are created after agency 10 is set up, or even if new features are implemented after agency 10 is set up.

Agents can do a vast array of operations and can be built to work with other agents to form agencies with unique character. Examples of agents are agents for filtering search results, for filtering unwanted material from retrieved documents, for adding buttons to documents, for storing historical information, for storing user state, or for storing user configurations and preferences.

As embodied, agency 10 can host agents which were not contemplated at the time agency 10 is built, so long as the new agents conform to the agent interface standards. These interface standards can be enforced through the use of object oriented programming, wherein a class of objects labelled "agent" can be specified. An agent includes functions for, at least, modifying or adding transactions to transaction queue 22.

The requests and documents received via HTTP interface 28 are transformed into transactions, either directly or through an HTTP interface agent. Each transaction includes fields which identify the source of the transaction, the destination of the transaction and the data associated with the transaction. Since agency 10 operates in a document-oriented computing system, the data is in the form of a document or a reference to a document. In addition to packaging requests, responses and transactions, HTTP interface 28 might also transform requests and response based on information in machine database 26, which might describe how to reach a particular machine and which browser the machine is using (i.e., so HTTP interface 28 can modify responses to fit the appropriate browser).

The various elements of resolver 24 may, depending on implementation, be virtual elements or object references. For example, in an object oriented programming environment, the functionality of act_on processor 27 is contained as a method in each of the agents which are acting on a transaction. The same is true for match checker 25 and handler 29. Furthermore, the transaction might not actually move from place to place, but might be acted upon in transaction queue 23. Where the manipulation of a pointer to a data element, method or function would suffice instead of moving the actual element, method or function, a pointer is the data that is moved about in FIG. 2 instead of the actual data.

Various agencies will now be described. One generic agency is just a personal agency where a person runs any agents they want and controls their interaction The system shown in FIGS. 1–2 might be used in a byte- or file-oriented network, but most of its benefits derived from use with a document-oriented network. In a byte-oriented network, all objects are defined by a set of bytes and thus objects are generally viewed by the bytes they contain or the bytes they input or output. In a file-oriented network, objects are viewed as files. A common example of a file-oriented network is a local area network (LAN) on which a file server is mounted. The LAN emulates a local operating system's commands for file manipulation (list directory, change directory, move/copy/delete file, etc.) to make a remote file look like it is a local file. In some file-oriented operating systems, such as Unix, peripherals are made to look like files so that file manipulation commands can just as easily apply to peripheral manipulation. Thus, printing a file on a printer can be done by copying the file to the file representing the printer.

In a document-oriented network, all objects look like documents. With documents including compound documents with components coupled by links, all the documents on all Web servers appear, to the user, as one big, linked document. The Web agency takes this concept much further, in that almost everything that is accessible over the network appears as a document. Once documents are the unit of computing, they can more easily emulate their paper counterparts, in that documents can be filled out, stored, mailed, archived, etc. using a paradigm familiar to anyone who has dealt with paper before. One side effect of being document centric is that the tools used to manipulate documents become interchangeable. The analogy in the paper document domain is that pens and desks become interchangeable commodities and a document can be edited with any pen and stored on any desk.

A document-oriented computing system looks like a network of agencies passing documents among themselves (see FIG. 1). In such a system, input, output and storage devices become simple to deal with, as they are all just compound documents. Input devices are document sources, so they might appear from the perspective of an agent requesting a document from the input device to be a single document that is constantly being updated, an ever-expanding collection of documents, or a client that is constantly transmitting documents to one or more destinations. Output devices are document sinks, which might appear to be a document that can be updated, a constantly expanding collection of documents, or a client constantly requesting documents from one or more sources. Storage devices have aspects of both input devices and output devices, where documents can be sent to the storage devices and later retrieved.

Figure 3:
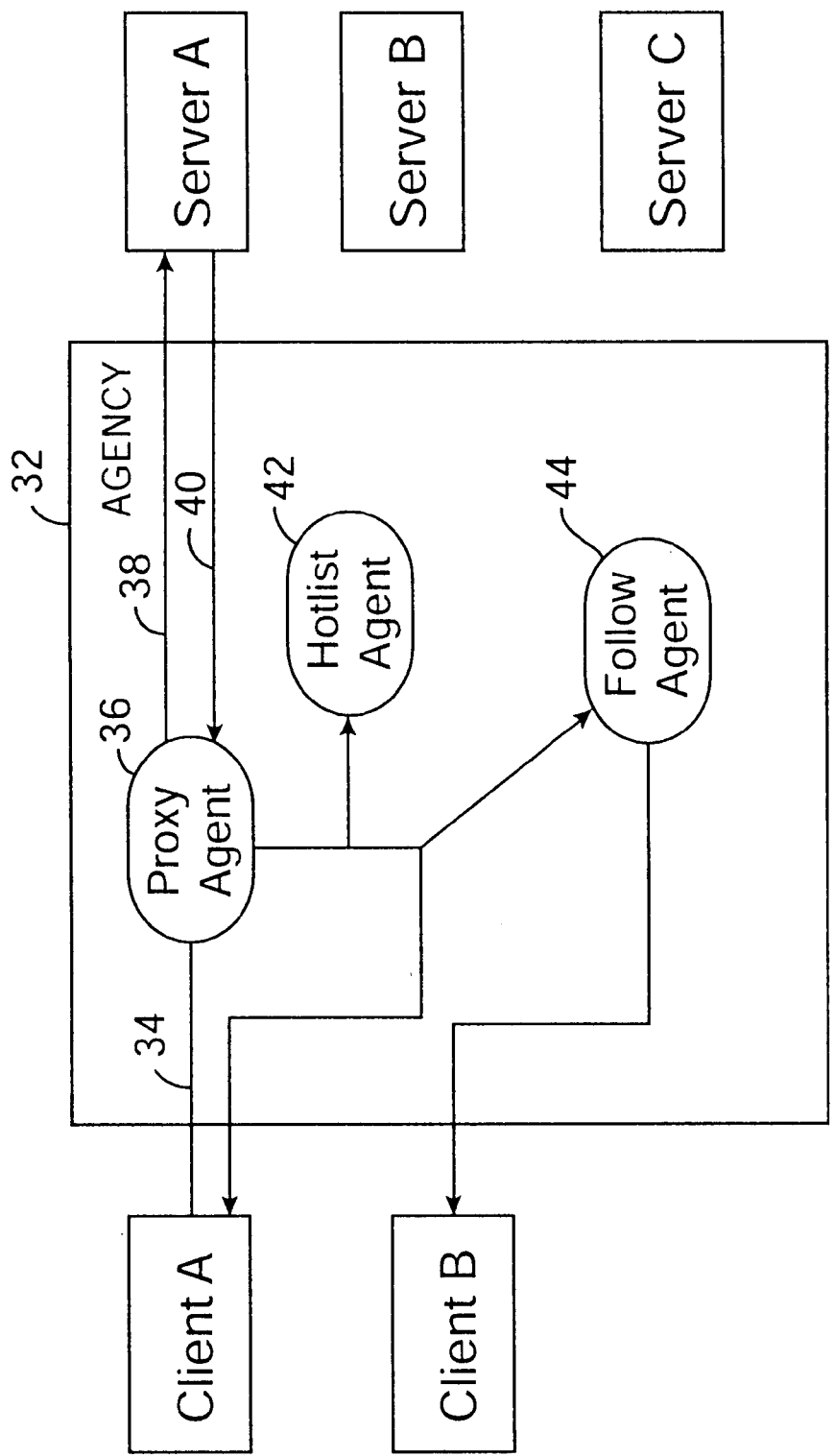
FIG. 3 is a block diagram of a sample request flow of a document request from a Web client to a Web server through a Web agency.

FIG. 3 is a logical block diagram of a simple agency. Agency 32 is interposed between client A, client B, server A, server B and server C. The sample request illustrated is a simple request for a document, with client B "following", or monitoring, what client A is seeing. Client A sends a document request to agency 32 (shown as line 34). The document request is handled by a proxy agent 36, which sends the document request to server A (line 38), which returns the requested document to the proxy agent (line 40). Significantly, client A need not be aware that a proxy agent is interposed between it and server A, nor need server A be aware of the proxy agent. This allows for the use of existing clients and servers with agency 32. Lines 34, 38 and 40 define conventional HTTP channels.

The document request from client A is actually first received by the HTTP interface (not shown; see FIG. 2) of agency 32, which pushes a transaction with the document request onto the transaction queue. Proxy agent 36 is the agent which handles the document request, either by directly requesting the document or by generating a transaction which causes the document to be retrieved. Either way, the retrieved document is pushed onto the queue as a transaction when the document is received. That transaction is matched by the resolver with a hotlist agent 42 and a follow agent 44, but is handled by default transaction method which sends transaction to client. Thus, hotlist agent 42 and follow agent 44 only "act on" the transaction while proxy agent 36 handles the transaction. Of course, since follow agent 44 is called upon to perform I/O, the resolver might create a new transaction which is handled by follow agent 44 rather than having follow agent 44 merely "act on" the original transaction.

Hotlist agent 42 examines the document passing to client A and stores a reference to the document in a hotlist database maintained by agency 32. The hotlist database might be later accessed, again as a document, by a client sending a document request which the resolver would match up with the hotlist agent as the handler of the transaction.

Follow agent 44 also examines the document passing to client A and sends a copy by generation of a transaction with client B as the destination of the document to client B. This way, a user or computer at client B can follow what is happening at client A. One application of follow agents is for training other users. Another application is for local storage of all documents retrieved by a client. Note that this can occur whether or not client A is built with the capability to store all retrieved documents. In the example shown in FIG. 3, client B is a "recipient client" such as recipient client 20 shown in FIG. 1.

As with hotlist agent 42, follow agent 44 can be controlled by sending conventional HTTP document requests to agency 32. For example, each document supplied by follow agent 44 might be modified by follow agent 44 to include HTML buttons labelled "Stop Following", "Rewind", "Refresh", "Alert", "Options" or the like. Thus, each page would appear to client B with additional buttons on the page itself. By appropriate assignment of URL's for the buttons, when pressed they would send appropriate messages to follow agent 44. Clicking on the "Stop Following" button might cause client B to send an HTTP document request which references a URL for which the resolver generates a transaction which will be handled by follow agent 44. As transactions on transaction queue 22 are handled, follow agent 44 will receive the transaction and react accordingly. For the "rewind" button, follow agent 44 will recall and resend documents from a local cache. For the "Alert" button, follow agent 44 sends a document to client A indicating the nature of the alert. For the "Options" button, follow agent 44 returns a document, usually an HTML form document, to client B to get further input from the client.

Figure 4:
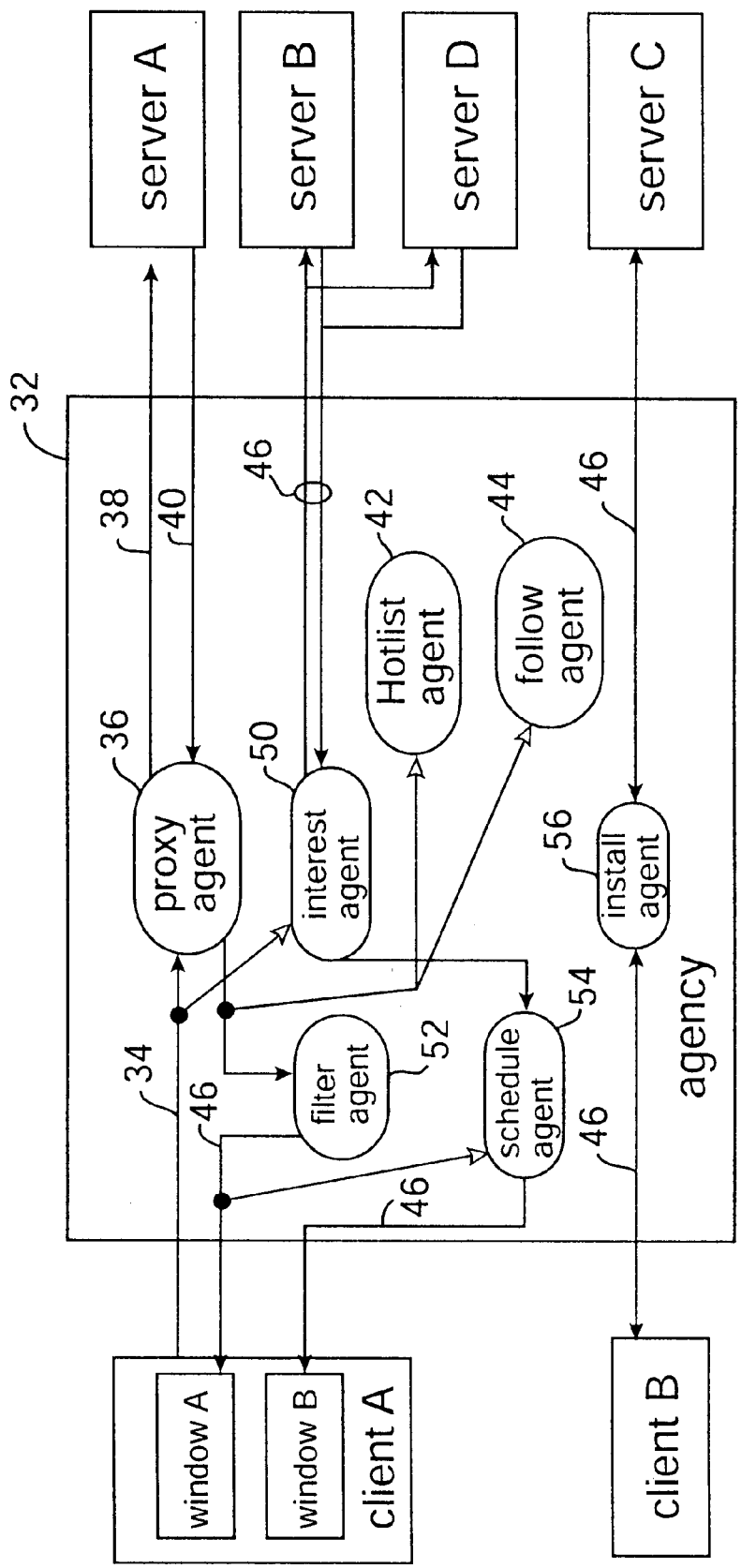
FIG. 4 is a block diagram of a sample request flow which is more complex than that request flow of FIG. 3.

Referring now to FIG. 4, a more complex set of interactions with agents is shown. In addition to proxy agent 36, hotlist agent 42 and follow agent 44 described previously, FIG. 4 also shows a number of connections 46 external to agency 32, all of which can be conventional HTTP channels. Also shown are an interest agent 50, a filter agent 52, a schedule agent 54, and an install agent 56. Interest agent 50 intercepts activity which indicates a user's interest and automatically gathers additional documents relating to those interests. Filter agent 52 receives sifts through the documents retrieved by proxy agent 36 and modifies them according to filtering rules before the documents are returned to client A. Filter agents can be used to cull unwanted detail or to filter objectionable material. Schedule agent 54 receives documents and multithreads them so that the user is not waiting for documents to load. If the connection between servers and the agency is slower than the connection between the agency and the clients, schedule agent 54 might attempt to anticipate which links the user will follow (possibly with the assistance of interest agent 50) and cache those documents at the agency. Install agent 56 receives requests for installation of particular agents into the agent array. As should be apparent, many other agents can be instantiated by agency 32 for handling many tasks, even tasks which were not contemplated in the design or implementation of clients, servers, or even the agency itself.

A document retrieval operation using agency 32 as shown in FIG. 4 will now be described. Client A requests a document from server A, from window A, by sending an HTTP document request (usually including a URL as part of the request). Instead of the request being sent to server A directly, it is sent to agency 32. The agencies HTTP interface (not shown) formats the request into a transaction which is placed on the agency's transaction queue (also not shown; see FIG. 2). The agency's resolver matches the document request transaction with proxy agent 36, which sends the document request out and retrieves the document from server A. When the document is received, a transaction is created for it and placed on the transaction queue. As was shown in FIG. 3, the resolver matches the transaction with hotlist agent 42 and follow agent 44. The resolver also matches the transaction with the interest agent 50 and has the filter agent handle the transaction. Interest agent 50 scans the transaction to get a sense of what types of documents the user is retrieving and then independently obtains those documents by pushing document request transactions onto the transaction queue. The interesting documents are returned and formed into a transaction directed at interest agent 50. Interest agent 50 handles the transactions by passing them off to schedule agent 54, which presents a list of interesting items to client A in window B. By proper arrangement of transaction-agent matches, schedule agent 54 can be alerted to each document returning to window A from filter agent 52 and use that information to update its schedule tables to remove references from the list of interesting items once documents are retrieved by the client.

Install agent 56 matches with transactions which are requests for agents to be installed or to be included in the resolver's list of agents to be considered.

The structure and operation of a Web agency having been described, a number of exemplary applications of a Web agency will now be described. One such agency is a personal information agency similar to that shown in FIG. 4. A personal information agency acts as an intelligent filter and monitor of documents which operates globally over all of the user's interaction with the network. For example, a user might want to use a variety of different browsers, in a variety of different places, but still have a single, global history list. This is done by the personal information agency. The personal information agency can be anywhere on the network, preferably at a site that is reachable from all the various locations the user might desire to view documents on the Web. Because the input and output to the Web agency is conventional HTTP, the user can use any browser and get beneficial results. If a user is a Web page designer, a Web agency with a follow agent would allow the user to look at a document using multiple different browsers simultaneously, so that the user can get an idea of how a document might look in a variety of browsers.

The personal information agency can also be used to customize external documents for the user, allowing a user to add personal annotations to documents (which are added to the document each time the agency retrieves the document), or could be used to cache documents by scanning all incoming documents for references and obtaining the referenced documents before the user requests them. Also, additional functions of the agency can be added as "buttons" on documents as they are delivered.

Figure 5:
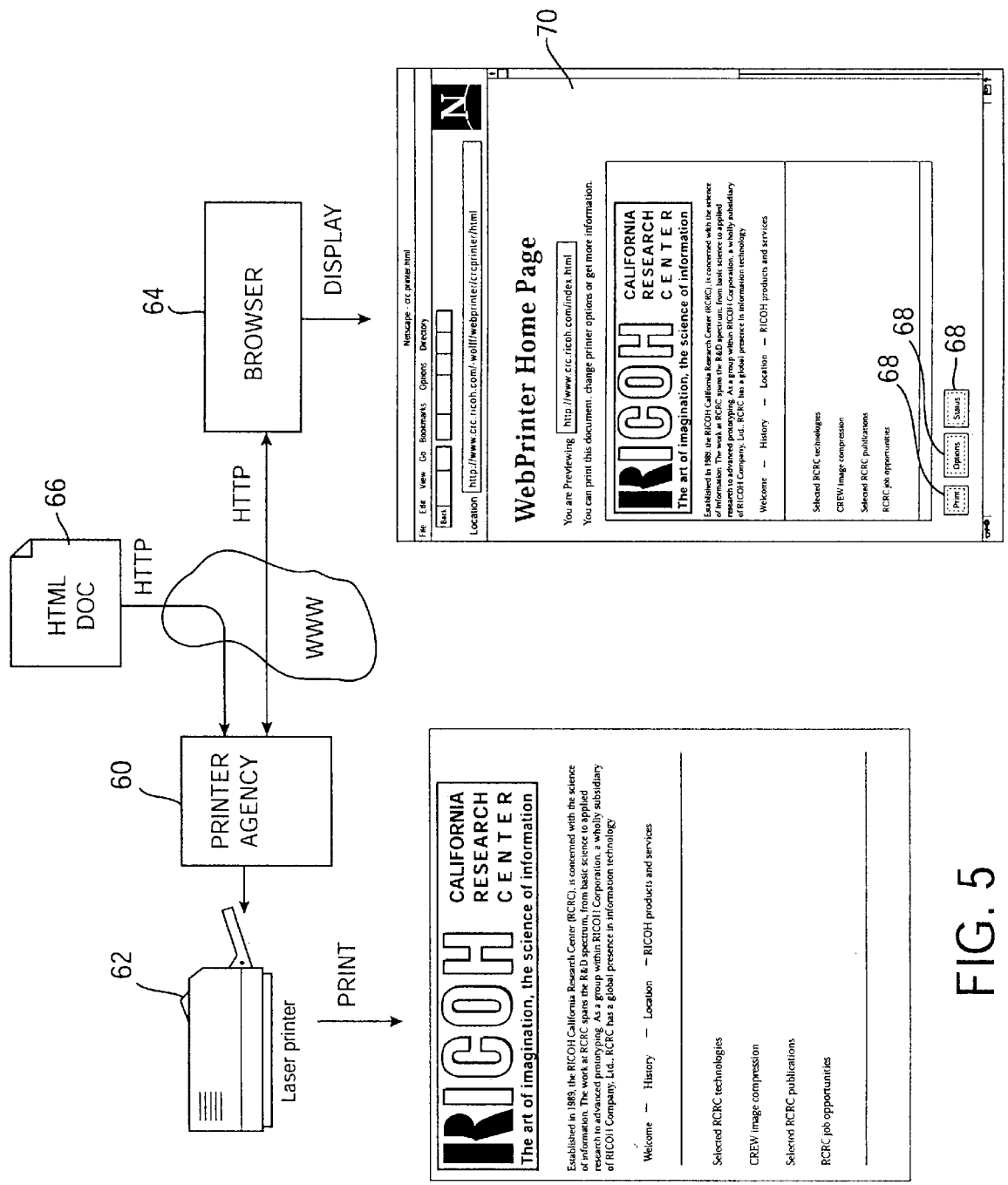
FIG. 5 is a block diagram of a Web agency configured to be a Web printer agency.

Another application of a Web agency is the peripheral agency, such as a printer agency 60 shown in FIG. 5 interposed between a peripheral, printer 62, and a document-centric network. Printer agency 60 can be used to print a document 66 as requested by a user, as well as to render a print preview image for display as part of a preview page 70 on a browser 64. With input, output and storage devices, control and configuration of these devices is done through documents, possibly through documents including tables and forms. Thus, a peripheral can emulate a Web server and be a destination for HTTP PUT requests for storage or output of documents and HTTP POST requests for configuration forms. A peripheral can also emulate a Web client, being the source for HTTP GET requests (for documents to be output) and PUT or POST requests (for document input). The peripheral might also serve as a proxy.

Unlike a peripheral, a peripheral agency can transform documents or requests for documents (e.g., transforming a request from one client into a request from another to effect a rerouting of the response). Thus, an agency represents a more complex and novel Web client, one that operates on behalf of a user peripheral agency act on behalf of peripheral (many users) to manage input devices, output devices, storage devices as well as computational resources.

Referring again to FIG. 5, printer agency 60 is used to provide a document-centric interface to a printer 62. When a user requests, via browser 64 or otherwise, that an HTML document 66 be printed on printer 62, the user simply sends a request for document 66 to printer agency 60, which obtains the document, renders it as it might appear on printer 62 (or a low-resolution version of the rendering), attaches control buttons 68 to the document and serves the print preview version of the document to the user. As shown in FIG. 5, the output 70 of browser 64 includes control buttons 68 labelled "PRINT", "OPTIONS" and "STATUS". The "PRINT" button contains a tag which will cause printer agency 60 to send the document to printer 62, while the "OPTIONS" and "STATUS" buttons cause printer agency 60 to serve up an option selection form and a printer status page, respectively.

Because Web agencies communicate using standard Web protocols, it is not necessary that all agents, client and servers share a common programming language, interface or operating system. Thus, printer agency 60 can interact with browser 64 even if they are on different platforms. In fact, browser 64 can interact with printer agency 60 even though browser 64 is unaware of the concept of an agency. The peripheral agency is also ideal for handling documentation requests, as all the documentation for a printer could be provided to the user by way of document requests sent to printer agency 60. Printer agency 60 might handle additional configuration tasks such as having the user select a printer by presenting the user with a Web page showing printer locations and includes a clickable map of the printers.

As shown in FIG. 5, printer agency 60 formats print preview page 70 with controls not found on the original document, namely the button controls 68 mentioned earlier and a control indicating the URL of the page being previewed. This is an improvement over previous browsers which required the user to use buttons provided as part of the browsers itself to print and print preview documents. Because not all browsers can be preprogrammed to deal with all printers (currently, no browsers have true preview functions), a user could not view a page as it might be printed, but as the browser presumed it might be printed. With the printer agency doing the rendering, a more accurate print preview is provided, while freeing each browser manufacturer from having to code printer emulators for many different printers. Printer functionality can change without change to browser or host software.

With a printer agency, documents in HTML form (or any other form, for that matter) can be sent to the printer and be rendered with the settings provided by the user, instead of the author of the document, as is the case with page description languages such as Postscript® and Acrobat™ languages. The bandwidth needed to transfer the document to the printer agency is also reduced since it is in HTML format. Because the documents are still in HTML format when they arrive at the printer agency, the printer agency can perform some clever handling of the documents. For example, the user might specify that documents to be printed should be followed by one or more levels of linked documents. For documents with a finite set of links, the user might specify that the printer agency print a "book" of all the documents. Because the printer agency is transparent to the user's clients, it can transparently retrieve all the necessary documents for rendering and printing. A printing agency might also create new documents as part of the document stream, such as a table of contents.

Figure 6:
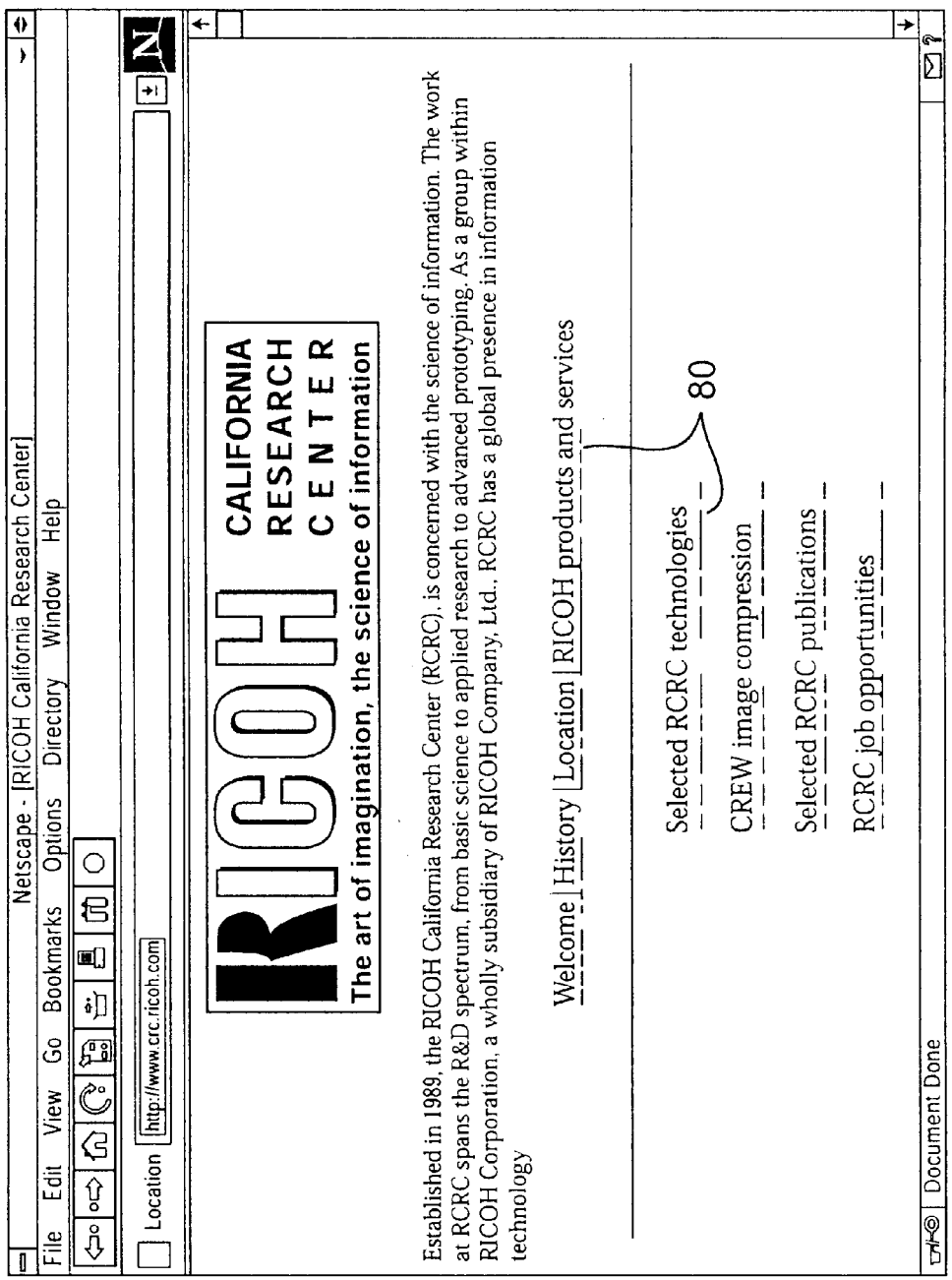
FIG. 6 is an illustration of a hypertext page printed with machine-readable anchor links, preferably printed using a Web printer agency according to the present invention.

FIG. 6 shows an example of what could be done using a printer agency. Because the document to be printed is presented to printer agency 60 in the form of a document, as opposed to rendering instructions such as a Postscript® file or a binary file, printer agency 60 can interpret the document. As shown in FIG. 6, the document is interpreted and machine readable underlines 80 are added to each of the links on the page. As shown in FIG. 5, these can also be included in the print preview version of the document. A similar system is shown in U.S. patent application Ser. No. 08/372,784, now U.S. Pat. No. 5,848,413, commonly assigned to the assignees of the present application. That application is in incorporated by reference herein for all purposes.

Many other examples of agencies which could be used with the Web exist, such as those shown in Appendix A. These and other agents and agencies might be used as translation.

A peripheral agency in the form of a printer agency is described above. A peripheral agency for input devices could also be used, for example, as a Web scanner. An input device is considered, by the input device agency, to be a source of HTML documents which are scanned into a digital scanner. As a source of documents, the Web scanner appears to clients as an HTTP server. Documents can be sourced using HTTP GET, PUT or POST commands. An advanced Web scanner might also manage a list of all documents ever scanned for serving as requested. Additionally, the advanced Web scanner can digitally sign, timestamp and encrypt documents.

A search agency is a Web agency which has agents to perform searches over available Web pages. Web search tools are known, but they typically execute locally on a server and are limited to what documents the server can see. With a search agency, a user can perform searches over any set of documents and can customize the search results or have a filtering agent or other processing agent deal with the search results before presentation to the user.

Figure 7:
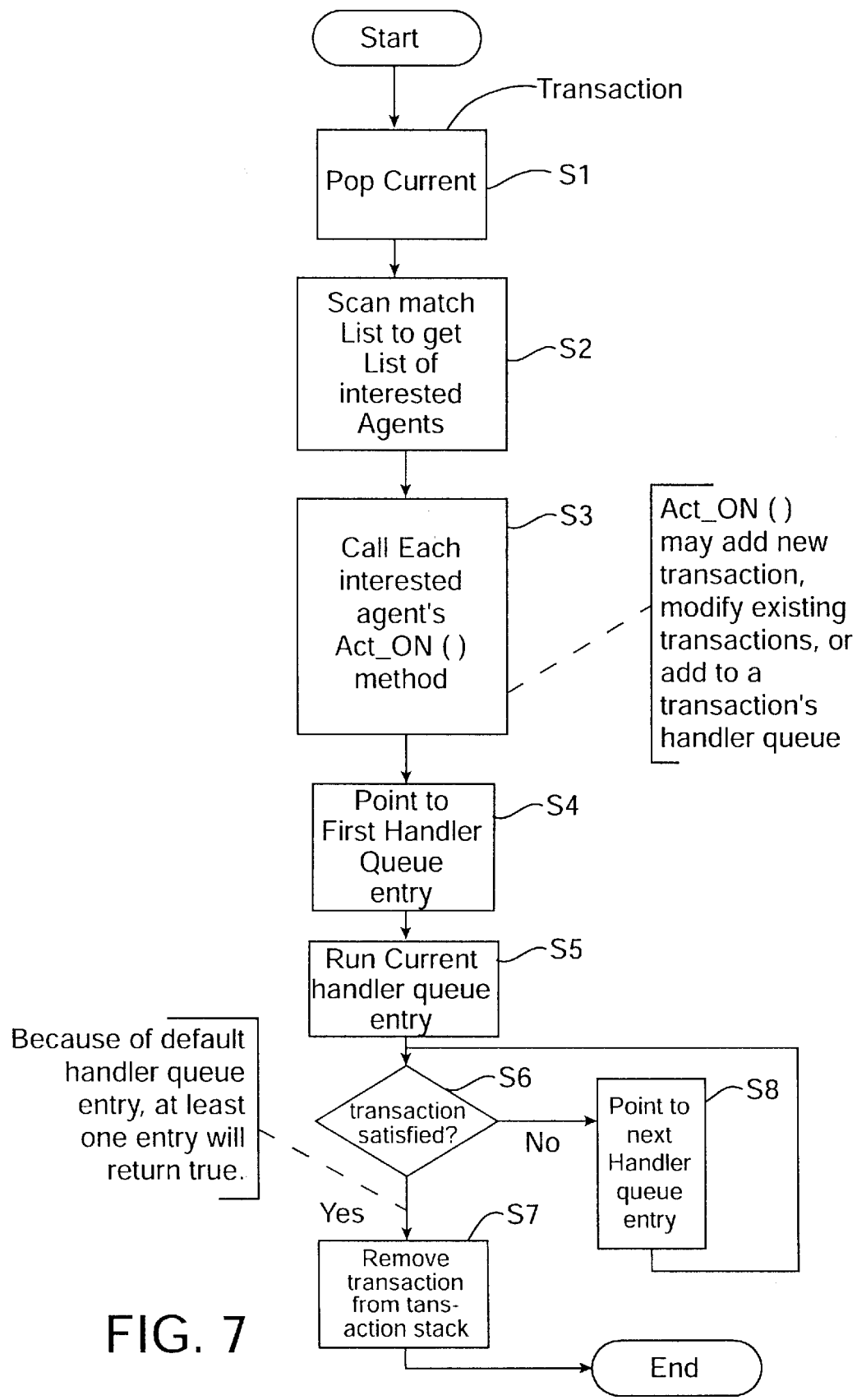
FIG. 7 is a flow chart illustrating a process for acting on and handling a transaction.

FIG. 7 is a flow chart illustrating a process for acting on and handling a transaction. In the flow chart, each of the steps are labeled with a step number from S1 to S8. Execution of the process occurs starting with step S1 and proceeding in increasing numerical order, except where otherwise indicated.

In step S1, a transaction is popped from transaction queue 23 (see FIG. 2). In step S2, the resolver scans the matched list to get a list of interested agents. As previously described, each agent has a criteria which is a function of transaction features. Thus, for each agent, a criteria can be evaluated using the feature list of the current transaction. If an agent's criteria are met, that agent is added to the list of interested agents.

Next, the resolver calls each interested agent. More precisely, the resolver calls the act_on() method for each agent (S3). As described above, the act_on() method may add new transactions, modify existing transactions, or add a hook to a transaction's handle queue. Once each interested agent has acted on the transaction, a pointer is set to the first entry in the transaction's handler queue (S4). With the first handler queue entry being the current handler queue entry, the routine or method point to by the current handler queue entry is executed (S5). If the transaction is satisfied (S6), which is indicated when the current handler returns a value of "true", no further handlers are called and the transaction is removed from the transaction stack (S7). On the other hand, if the current handler queue entry returns a value of "false", then the pointer is moved to the next handler entry (S8). Because a default handler queue entry associated with the transaction is provided at the end of the handler queue, and the program code pointed to by this default handler queue entry always returns a value of "true", the transaction is guaranteed to be satisfied. Typically, the default handler queue entry is an error messaging routine, or the like. Of course, alternate embodiments might exist where the successful completion of at least one handler queue entry routine is not guaranteed. In such embodiments, no alternate method of handling unsatisfied transaction after exhaustion of its handler queue would exist.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

APPENDIX A

1. Infrastructure

A. Agency Technology

1) Basic Agency

The basic agency is one of the key components of DOCS (Document-Oriented Computing System), since it lets an information appliance function both as a document source, a document transformer, and a document consumer.

A first experimental Agency prototype has been built using the CERN http server as a base, with agents written in PERL.

A second experimental Agency will be built entirely in PERL or Java. This will make it possible to load special-purpose code (agents) directly inside the agency, making it both efficient and easy to modify. It would be best, in fact, to build two experimental Agencies: one based on the perlWWW library, and the other on the Jigsaw Java server.

There should be several different ways of running agents, and having multiple agencies will help:

Agents as proxies (agencies): Having multiple Agencies will be useful for this, as we can write agents in either PERL or Java.

Agents as code snippets inside the Agency: Again, having multiple Agencies lets us use either PERL or Java.

Agents as CGI (Common Gateway Interface) scripts: The desire to run multiple agents on a document and let them modify the document itself might be a more complex CGI script.

Agents as filters: This requires an Agency which can fire up a pipe and route documents or requests through it.

Agents as viewers: Agents are programs which are passed a reference to a file containing the document on their command line.

2) Physical Agency (WebWart)

The name WebWart comes from the term "wall wart," meaning a power supply designed to plug into a wall socket. The "official" name would be "Peripheral Interface Agency", "Web Peripheral Interface", or the like. The WebWart allows us to convincingly demonstrate agency-based peripherals, as the WebWart is a physical embodiment of an Agency to which we can attach to peripherals.

In the simplest case, an experimental WebWart could be a PC in a small case with no display, costing $500–$1000 each depending on RAM and compute power. They would have a small amount of configuration software to allow the IP address, host name, etc. to be set via HTTP. They should be a distinctive color to distinguish them from PC's.

Portable WebWarts would be a little more expensive, though they might be supplied without displays, such as laptops or palmtops from Ricoh Japan. The form factor and price range to aim for would be something like the add-on network interfaces for printers, which are in the $300–$500 range.

Eventually WebWarts will be real products, and will come in a wide range of sizes from PCMCIA card (WebCard) to rackmount. This is for two reasons:
1. they will be used to interface with legacy peripherals
2. they will be used to interface with special-purpose peripherals such as laboratory equipment.
3. they will be the physical embodiment of the PIA and WebFile.

3) Scalable Agencies

A smallest level of a scalable agency might be a very light-weight Agency which can be integrated into network appliances as small as cameras, keyboards and pagers (as well as the Magic Pen). It can be single-threaded and can use a simplified protocol and a restricted set of MIME types. It will usually only interface to a small, fixed set of agents.

The next level might be a medium-weight Agency which will normally serve as a PIA. It is multi-threaded and capable of interfacing to disks, networks, and Agents written in a wide variety of languages.

The highest level of a scalable agency is a big server Agency on the scale of Apache, capable of running on hardware ranging from Pentium PC's to Icarus.

An Agency is an architecture rather than a single program, so it should be possible to produce Agencies in a variety of languages, including C, C++, Perl, and Java. If it were impossible for them to share a common code base, they might still feasibly share a common set of classes and/or interfaces (possibly specified in IDL).

4) Embeddable Agencies

The enabling technology for such things as Webwidgets, WebWindows, and WebCards is a tiny, embeddable Agency. The embeddable Agency needs to have low power consumption, a simple short-range wireless interface and the ability to interface to a wide range of simple hardware.

For prototyping, it also needs the ability to download code (agents) as well as data (documents). This implies that there must be some provision for security, as well. Packaging agents as documents gives us an easy way to install them.

One of the 16-bit controller chip families would work, especially if it had the ability to address at least 1 megabytes each of code and data. Squeezing an agency into 128K might be tricky, but should be possible.

(The WebFile and WebWallet can be implemented on an Intel chip using Linux and the "standard" PIA architecture. It might be possible to prototype the WebWallet using one of Intel's laptop CPU modules.)

B. Document-Oriented Computing

1) InterForms

An InterForm (Interface Form) is a single document which combines a program with its HTML user interface forms and both user-level and implementation-level documentation. There are several possible variants to this:

HTML documents with embedded code fragments, e.g. <code language=PERL interface=CGI>. . .

Code in various languages with a suitable toolkit for generating HTML on the fly.

Directories containing mixed HTML and code, with a suitable Makefile. Such a directory could be bundled up in a .tar file and shipped via HTTP by way of a suitable CGI interface. All this takes is a suitable index.html file.

On the "client" end, we will need a mechanism for installing packages such as these in the right place in an Agency's files. An "install agent" is used for this.

2) DOFS Prototype (Extended Cache)

The agency needs a document cache which is extended to allow arbitrary named attributes to be associated with documents. This cache can also serve as a prototype file system for the WebFile.

The best implementation would appear to be one in which every document is represented by a directory which contains both the original document and any additional documents required. One result is that when one browses the cache with a web browser, there will be a simple and rather obvious mapping between the original URL and all of the information associated with it.

A parse-tree representation for documents might be used. If so, a "map" file might be associated with each stored document.

3) Document-Oriented File Systems

In the longer term, we want to move from file systems containing text to file systems which contain parse trees. Naturally, the text will always be available for use by legacy applications and for transmission over networks.

There will be two versions of this:

1. A DOFS designed to be stored in an existing Unix filesystem.

2. A DOFS designed to be stored in a dedicated disk, disk partition, or file.

It is probably not practical to make a DOFS work on top of a DOS filesystem; the restrictions are too great. The dedicated-partition version, however, could easily be stored in a large DOS file just as the Windows swap file is.

In order to have dynamic documents, it needs to be possible to replace a node at any level with a piece of code. (Note that this is very Self-like.)

There are several possibilities for representations:

1. Text file with associated map file.
    fastest for retrieving the raw text
    can be very compact
    can handle very large files using seek
    slow random access unless buffered 2. Linearized parse tree with binary in the nodes.
    fastest for sucking a parse tree into memory
    slowest for unbuffered random access 3. OODB.
    fast for sparse random access.
    slowest sequential access
    large code hit
    expensive 4. DOFS (Document-Oriented File System).
    Ground-up custom design
    essentially a parse-tree-oriented file system
    uniform addressing from http: down to words.
    could be regarded as a traditional file system with tiny files
    . . . or as a "frozen" lisp-machine-like or self-like virtual memory The text+map option seems like a good initial compromise; it has some additional advantages:

maps can be platform-dependent binary
no impact on legacy software
can easily reconstruct the map from the text
can have multiple maps for multiple views of a file
if we know the file won't change, we can discard it
file and map can be compressed separately The document-oriented file system might have an interface similar to an existing "WWFS", which provides access to the Web as if it were a file system. For example, one could use "URL##selector" to give addressing within documents, where the syntax of a selector depends on implementation.

4) Document-Oriented Programming Language

A document-oriented programming language would be "document-oriented" in two different ways:

1. It would have SGML-like syntax, so that it could easily be embedded in documents.

2. It would operate directly on documents; i.e. documents would be first-class values.

The language would be rather like LISP or Self. It would be like LISP in that programs and data would have the same representation; it would be like Self in that data would have an attribute-value list structure.

C. Agent Technology

Agents would, of course, be implemented as InterForms and would be stored in a Document-Oriented File System. This section describes specific kinds of agents.

1) WebWidget Interface

A WebWidget is a Web-enabled input device. It looks like a client, and is designed to POST a document to a pre-determined URL when some event occurs.

WebWidgets include:
    pushbutton (posts a single bit)
    keyboards (posts a single character)
    keyboard+1-line display (posts a string)
    touch screen (posts coordinates)
    camera/scanner (posts an image and its parameters)
    microphone (posts an audio stream)
    video camera (posts video+audio)
    GPS receiver (posts coordinates)

2) WebPrinting

In order to make paged devices such as WebPrinters and some WebWindows work, HMTL rendering issues need to be addressed, such as:
    pagination and page layout
    applying style sheets
    high-speed, low-memory rendering
    flattening multi-file documents
    Handing Postscript, Acrobat and other proprietary formats, either as embedded images or as full documents with the appropriate MIME type
    specifying options (InterForm design)

3) Object Interface

This provides an interface to CORBA and OLE objects. The object interface allows for automatically constructing a "live document" and corresponding server-side (and client-side, if necessary) code, given any object's interface description.

There are really several aspects to this problem:
    Using the run-time interface to construct and handle forms "on the fly."
    Preprocessing IDL descriptions to "compile" corresponding forms.
    Merging document-oriented InterForms and generic markup with object-oriented OpenDoc parts and containers.

D. Other Technologies

1) BodyWeb

Many applications (e.g. the WebWallet, WebCard, WebPAD, etc.) would benefit from a low-power, short-range (1 meter radius), high-bandwidth (100 megabit/second) local network. Such a network would connect everything that a person is carrying or sitting close to.

Two technologies which might be used are inductive coupling (which Xerox used in their Ubiquitous Computing project) and radio. Infrared has line-of-sight problems, so a user can't store things in pockets); ultrasound has bandwidth and interference problems. Spread-spectrum radio might be best.

2) Live Documents

Live documents raise a number of issues:

How to construct a framework for live documents?

What tools are needed for making live documents?

Can they be constructed automatically from, e.g., CORBA IDL specifications?

What tools should be provided to the user? Obviously, any text editor can be used for editing and customizing, but maybe some interesting alternatives might be better suited.

What server-side CGI's might be needed to make a live document work?

2. Applications

A. Agencies

1) Personal Information Agency and Agents

The Personal Information Agency (PIA) is described elsewhere. It is a simple Agency with a few InterForms for configuration and a DOFS used for caching, annotation, temporary storage and agent storage.

2) PIA Agents

Agents are also described elsewhere. Most agents will be simple, and many will be written ad-hoc as one-off hacks, and exchanged by passing around their URL's.

3) WebFile

A WebFile is a dedicated document server. It should give its user(s) the option of using CVS for version control, and it should include encryption for security. Preferably, all configuration would be done using the Web. It might be useful to modify CVS's remote-access server to use HTTP instead of rsh. The preferred way to get documents into a WebFile is to proxy through it, effectively using the WebFile as a cache.

The prototype WebFile is just a WebWart with a big disk. The software for a prototype would be slightly less trivial. It needs to do:

network administration (IP address, mask, gateways, node name . . . )

file manipulation (PUT request, copy from URL, rename, delete . . . )

link maintenance (rename links when a file is moved . . . )

version control (The Jigsaw Web server already has CVS support.)

4) WebCD-R

A WebCD-R is something of a cross between the WebFile and the WebPrinter. Documents, including whole web sites, are loaded into it by proxying. They can then be archived by writing them to CD-R. The contents of the CD-R should be essentially an image of the proxy's cache. The CD-R can then be browsed using a proxy server, which can compare "cached" dates with current ones and fetch from the network any pages that have changed.

The software requirements are considerably simpler than for either the printer or the file server, because:

There is little need for file manipulation

There is no need at all for version control

There are far fewer "style" parameters than on a printer mkisofs already exists

On the other hand, a typical implementation would need at least 1500 megabytes of disk for the source tree and the destination .iso file.

5) WebCard

This is a PCMCIA-sized Agency with a short-range, high-bandwidth wireless or wired network link, that would allow existing PCMCIA devices such as palmtops and digital cameras to function as Web appliances. It could also function stand-alone as a tiny portable WebFile, e.g. for sensitive data, digital cash, or personal identification. One possible implementation has a PCMCIA type II form factor and connector, with flash memory and a rechargeable battery. Also, it might have an IrDA or inductive link, which has lower bandwidth than the PCMCIA connector, but it does not require a slot and connector.

Preferably, the WebCard includes a "micro-dock" to give it more power and slots for an Ethernet connection, modem, pager, audio, camera, or disk.

6) WebWallet

This is the "notebook" version of a WebFile. It is small, but not PCMCIA sized; in fact it preferably has a PCMCIA slot. It does have to be light-weight and battery powered. Being single-user, it also functions as a PIA.

To be specific, it would have:

Built-in disk, probably about 1 Gb in 2.5" form factor: This is enough for a user's complete personal state.

Rechargeable battery: Since it does not need a backlighted display or a very powerful CPU, and the disk will not be running continuously, battery life should be excellent. A cellular-phone battery might be a good choice.

PCMCIA type II slot: The slot is used for WebPAD, RDC-1 flash card, ethernet, modem, camera, etc.

IrDA, inductive links

Connectors for audio I/O

High-speed digital I/O (probably FireWire)

Serial port for modem or Ricochet

Belt hook or pouch: The WebWallet should fit into camera or personal stereo pouch.

The WebWallet also needs a small, inexpensive charger/docking station which can be used to connect it to a network. This needs to be a cradle rather like the base station of a portable phone, or the cradle of the Pilot PDA, rather than something that requires any effort or fumbling on the user's part. The idea is that users will take their WebWallets along everywhere, the same way they currently take a notebook or a purse. If its short-range wireless link has sufficient bandwidth, it may not even be necessary to put it into the cradle except at night.

Uses include:

Dock/charger for WebCard and WebPAD

RDC-1 photo album

Digital scrapbook

Notebook (with WebWindow)

Backup for PAD

Digital camera (with PCMCIA camera)

CD-quality audio recorder/player

Phone (with handset and cellular or Ricochet modem)

In addition to being a photo album, the WebWallet can work closely with other PCMCIA memory cards, such as those used in PDA's. It can use the card's volume ID to position it in the user's document hierarchy, and can be preset to load, unload, or synchronize with the files on the card.

B. Peripherals

1) WebPrinter

The WebPrinter is a printer that
- prints HTML directly
- makes its own HTTP requests
- can be used as a proxy for seamless browsing, printing, and previewing
- has CGIs which can be given a query string with a document to be printed or previewed A hardware prototype could be built using a Ricoh laser printer and a WebWart. A clickable map leading to each printer's home page might be provided. It would be useful to have a WebWindow next to each WebPrinter for last-minute browsing and format-tweaking, so we could actually cheat by putting some of the printer software on the "control panel".

Eventually, of course, we will want a complete Web-enabled suite of MFM's, scanners, printers, facsimile machines, copiers, IM3's, and so on.

2) WebWindow

The real WebWindow is not a browser! It is, instead, a full-fledged Information Appliance, and as such is basically a server, designed to work closely with a PIA. It is quite different, therefore, from the "traditional" Oracle/Sun/Apple/whatever Network Computer.

The WebWindow is designed to work only with a PIA. As such, its "browser" aspects are pared down to the minimum. The PIA interacts with the WebWindow not only by responding to GET requests, but by sending PUT requests. The WebWindow thus functions, to a large extent, as a display server akin to an X server or a WebPrinter.

A consequence of all this is that the WebWindow has no need of an options menu or any other configuration information; it gets all that from the associated PIA. It is easy for a Webwindow to work with any number of users; a user only needs to "log in" to their PIA.

As a piece of hardware, a stand-alone WebWindow will normally work with a WebWallet or with a PC running a PIA. A WebWindow associated with some other appliance, such as a WebPrinter, will be able to use the WebWallet of its current user to get identity and state information. A WebWindow has even less need for disk than a Network Computer.

Of course, a WebWindow can also easily be integrated with a PIA, because it already contains a server.

Design issues include defining the requirements for a WebWindow and figuring out how best to use one.

3) WebWindow Mock-up

The WebWindow Mock-up is not the WebWindow. The WebWindow Mock-up is trivial - - - just a G1200 or Thinkpad running a Web browser. It's important only because it's useful for convincing demos. The fact that the G1200 is made by Ricoh will help in demos.

The only things that will require any additional effort are:
- putting Linux on the G1200 (required if we want a PIA to run on it)
- tapping into the browser's API
- making effective use of two windows, one for pushing to and one for browsing from
- making an elegant (physical) support bracket so that we can attach a G1200 to some other appliance (like a printer) as a control panel Unfortunately the G1200 is rather expensive, so we may need to consider other possibilities. The PC-110 is one; it is known to run Linux, and has a keyboard (which might be useful in some circumstances). The new Zaurus MI-10 is another; it apparently has a 66 MHz 486, color display, Windows 95, and a Web browser.

4) WebImager

A WebImager is a Web input device for images. It needs to be able to:
- PUT or POST images to a designated URL
- keep track of where they go
- use an Agency for configuration Naturally, this is closely related to the WebCam, RDC-1 and IM3 efforts. The WebImage might use a flat-bed scanner, a fax modem, a Connectix camera, or an RDC-1's flash card as the input device. The user-interface software is the same in any case. Only the low-level capture software would be different.

5) WebPAD

This is a pocket-sized, single-user WebWindow. This would appear to be more a matter for package design and physical prototyping than for research; the real research would come in exploring how to use it. The way to experiment with the WebPAD would be to equip everyone at CRC with one, and see what develops. It might be possible to prototype it using the USR Pilot PDA. To be specific about it, I envision:
- No larger than 3" by 5"
- Flash memory
- IrDA or inductive link
- Touch-sensitive LCD display; small speaker
- Rechargeable battery A PCMCIA connector would allow it to slip into a laptop, micro-dock, or WebWallet for a higher-speed connection; the micro-dock would give it more power and slots for an Ethernet connection, modem, pager, audio, camera, or disk.

The LCD display would have several functions:
- Default: display "business card"
- Use signature for security
- Control how much data to exchange
- Some aspects of a PDA, such as limited data entry A WebPAD-WebCard combination could function as a:
- Digital wallet/checkbook/credit card
- Business-card holder (ideal for the Japanese ritual exchange)
- Nametag/badge/key
- Repository for personal data (name, address, medical history, etc.)
- Clock/calendar
- Calculator 6) Other Devices Other devices include a WebScanner, a WebCam, a WebFAX and a WebMFM. The WebMFM is a fully Web-enabled and integrated combination of IM3, printer, scanner, FAX, and so on.

Further research might examine how to format printed documents in such a way that they're useable as input devices (live paper). The WebFax technique may require considerable processing. To reduce the processing required:
- Format all links as footnotes which contain both the URL and the document's title (if known) and last-modified date.
- Put a checkbox next to each footnote, with a tiny barcode for the footnote number. (Optionally, these checkboxes could be formatted in-line and the footnotes omitted, or all the footnotes could be on a separate page at the end.)

Put a 2D barcode in the head, foot, or a margin, with the starting footnote number and either (1) the complete URL of the page and a timestamp or (2) the printer's URL and a hashcode.

What is claimed is:

1. A method of document retrieval and manipulation using a document agency that is interposed between at least clients and servers and that uses software agents to perform at least server tasks, client tasks and proxy tasks, the method comprising the steps of:

accepting document requests from clients at the document agency;

accepting responses from servers at the document agency;

creating transactions in a transaction queue local to the document agency in response to received document requests received by the document agency from the clients;

creating transactions in a transaction queue in response to received responses received by the document agency from the servers;

maintaining an agent array, onto which array agents can be added and removed by an agent registrar at the document agency, wherein the agent registrar is independent of the clients and the servers;

matching each transaction in the transaction queue with one or more matching agents from the agent array, wherein the matching step is done at the document agency;

processing said each transaction with each matching agent to extract information from the transaction, modify the transaction or create new transactions to be added to the transaction queue;

when a transaction represents a document request, using a matching agent or a satisfying agent to send the document request to a server; and when a transaction represents a document response, using a matching agent or a satisfying agent to send the document response to a client.

2. The method of claim 1, further comprising a step of maintaining a state for a particular user that persists across transactions, wherein at least the step of matching is performed according to the state maintained for the particular user.

3. The method of claim 1, further comprising a step of maintaining a state for a peripheral device that persists across transactions, wherein at least the step of matching is performed according to the state maintained for the peripheral device.

4. The method of claim 1, further comprising a step of maintaining a state for a particular client, wherein at least the step of matching is performed according to the state maintained for the particular client.

5. The method of claim 1, further comprising a step of maintaining a state for a server, wherein at least the step of matching is performed according to the state maintained for the server.

6. In a network over which clients request documents from servers according to a document transfer protocol, a method of expanding the functionality of the network independent of the clients and servers, the method comprising the steps of:

customizing a personal agency for use by a particular user, including storing a state for the particular user, wherein the personal agency is a process that runs under the control of the particular user;

accepting a document request from the particular user, the document request directed at a designated server and initiated from a requesting client;

routing the document request to the personal agency associated with the particular user;

routing the document request from the personal agency to the designated server;

updating the state at the personal agency to reflect the document request;

receiving, at the personal agency, the document requested in the document request;

transforming the document as indicated by the updated state of the personal agency; and routing the transformed document to the particular user.

7. The method of claim 6, wherein the particular user is one of a group of individuals using the personal agency.

8. The method of claim 6, further comprising a step of routing the document to a recipient client which is a client distinct from the requesting client.

9. The method of claim 6, further comprising a step of storing, by the personal agency, a history of documents requested by the particular user.

10. The method of claim 6, wherein the agency communicates with servers and clients using a hypertext transfer protocol where the units of transfer are documents.

11. In a network over which a client requests services from a peripheral, a method of interfacing the client to the peripheral comprising the steps of:

sending a document processing request from the client using a document transfer protocol;

obtaining the document from a server at a peripheral agency, wherein the peripheral agency is an agency specific to the peripheral to which the client is being interfaced;

routing a control document from the peripheral agency to the client, the control document containing representations of the document and controls specific to the peripheral agency for specifying actions for the peripheral agency to take relative to the document;

sending a control instruction from the client, using the document transfer protocol, from the client to the peripheral agency to initiate processing of the document by the peripheral.

12. The method of claim 11, further comprising a step of maintaining hypertext links in a printed document representing a portion of a hypertext document by:

formatting the portion of the hypertext document into a printable form;

generating machine readable printing symbols from link references;

inserting representations of the machine readable printing symbols into the printable form of the hypertext document at locations corresponding to locations of anchors for the link references; and printing the printable form of the hypertext document.

13. The method of claim 12, wherein the machine readable printing symbols form underlining below the anchors in the printable form of the hypertext document.

14. A Web agency, interposed on a network between a Web client and a Web server, for transforming document requests and documents transferred between the client and server, the Web agency comprising:

an agent array which stores representations of a plurality of agents at the Web agency;

a transaction queue;

a hypertext transfer protocol manager which includes programming for accepting document requests and documents from the Web client or Web server and programming for generating transactions to be represented in the transaction queue and to be operated upon by one or more agents in the agent array;

a resolver coupled to the transaction queue and the agent array for matching transactions with agents and for activating agents in the agent array as needed for initiating processing by such agents of transactions in the transaction queue which match such agents wherein the processing may include adding a translation to the transaction queue, removing a transaction from the transaction queue or modifying a transaction in the transaction queue.

15. The apparatus of claim 14, wherein the Web agency is a peripheral agency, a peripheral agency being an agency interposed between a peripheral and one or more browser clients to broker requests for document handling by the peripheral, the peripheral being independent of the one or more browser clients used to interact with the peripheral.

16. The apparatus of claim 14 wherein the Web agency provides and controls access to a document filing system.

17. The apparatus of claim 14, wherein the Web agency is a personal information agency, a personal information agency being an agency interposed between a user's clients and a network to maintain a personal state on behalf of the user and to modify documents and document requests according to the personal state maintained.

18. The apparatus of claim 17, wherein the personal state comprises a global personal hot list of selected resources which is global over a plurality of independent clients operated by the user of the personal information agency.

19. The apparatus of claim 17, wherein the personal state comprises a global personal history list of selected resources used by the user of the personal information agency where the global personal history list is global over a plurality of independent clients operated by the user of the personal information agency.

* * * * *